Aug. 6, 1968    A. F. J. ECKERT ET AL    3,395,890

PLASTIC CONTROL VALVE AND METHOD FOR MAKING SAME

Filed Oct. 23, 1965

INVENTORS
ARTHUR F. J. ECKERT
DAVID L. MOORCROFT

BY *Radford W. Luther*
ATTORNEY

United States Patent Office 3,395,890
Patented Aug. 6, 1968

3,395,890
PLASTIC CONTROL VALVE AND METHOD FOR MAKING SAME
Arthur F. J. Eckert and David L. Moorcroft, Glastonbury, Conn., assignors to Chandler Evans Inc., West Hartford, Conn., a corporation of Delaware
Filed Oct. 23, 1965, Ser. No. 503,177
10 Claims. (Cl. 251—333)

ABSTRACT OF THE DISCLOSURE

A method of constructing a fluid tight ball valve having a plastic valve housing by first initially molding the tapered seat into the housing to take advantage of the discovery that a reinforced plastic housing in the "as molded" condition has a thin outer layer of unfilled plastic, and secondly forcing the ball valve into the unfilled layer so that the unfilled layer is deformed into fluid tight engagement with the ball.

---

This invention relates to valves and more particularly to a control valve having a new and improved plastic housing wherein the valve is designed to control the distribution of high pressure fluids to fluid actuated devices.

Various types of control valves have been suggested heretofore which generally utilize a metal valve housing, such as wrought aluminum, into which a stepped bore with a sharp edge is machined and a valve member, such as a metal ball, is impacted or forced into the sharp edge to permanently deform the sharp edge and thus form a seat in sealing engagement with the valve member. This technique is designed to provide a control valve whereby the effectiveness of the sealing engagement between the housing and the valve member is capable of sealing high pressure gaseous operating fluids, such as dry nitrogen or helium gas. The method of forming a fluid tight control valve seat by impacting a metal valve member into the sharp edge of a bore in a metal housing has been very attractive in the past, however, the cost of obtaining a satisfactory fluid tight metal-to-metal engagement for the sealing of high pressure fluids, such as gaseous nitrogen or helium, has been a considerable portion of the total cost of the manufacture of such control valves and the object of many design change attempts to reduce cost and increase reliability.

Proposals have been made in the past to manufacture control valves at a low cost by mass producing valves utilizing a molded plastic housing and forming a valve seat in such a molded plastic housing by direct impact of a valve member into the edge of a stepped bore in said plastic bearing in order to obtain a control valve capable of providing the necessary fluid tight engagement required for satisfactory operation with high pressure gaseous fluids. Heretofore, all attempts to provide a control valve with a plastic housing that will provide the required high pressure sealing qualities, and at the same time maintain the necessary dimensional stability and dynamic response characteristics required of high performance control valve, have been unsatisfactory. It has been found that the low yield strength of thermoplastic materials permits the valve member to become imbedded in the plastic material to such a degree that excessive travel of the valve member results in dynamic instability during valve operation. To compensate for the lack of rigidity in thermoplastic materials, the basic thermoplastic material is compounded with a filler material, such as fiberglass. The filler material dispersed in the matrix of thermoplastic increases the yield strength of the compounded material, and enhances the rigidity of plastic valve housings molded therefrom, thereby reducing the distortion of the valve housing when the valve member is impacted into the valve seat area of the valve housing to obtain the necessary fluid tight engagement. It has been established that the structural advantages obtained by dispersing a suitable filler, such as fiberglass, in the basic thermoplastic material to prevent deformation of the valve housing during the impact seating of the valve member is defeated because the filler thermoplastic material is brittle and tends to chip and crack, particularly at sharp corners, thus preventing the formation of a fluid tight sealing area in the valve housing.

One object of this invention is to overcome the difficulty of obtaining a satisfactory fluid tight sealing engagement between a valve member and a thermoplastic valve housing molded from a thermoplastic material augmented with a suitable filler, wherein the augmented thermoplastic material is utilized to obtain the structural rigidity necessary to overcome the excessive valve travel caused by the large deformation that results when unfilled thermoplastics are used.

Another object of this invention is to construct a control valve incorporating a valve housing molded from a filled thermoplastic such that the valve assembly is capable of sealing high pressure gaseous fluids and exhibits stable dynamic operating characteristics.

Still another object of this invention is to provide a dynamically stable control valve capable of sealing high pressure gaseous fluids that can be easily and economically manufactured from a filled thermoplastic material.

It is a further object of this invention to provide a high pressure control valve having a molded plastic housing configured such that the valve member is impacted into a fluid tight sealing engagement with an as molded valve seat by initial cyclic operation of the valve and without the application of a valve seating deformation force prior to initial valve operation.

Another more specific object of this invention is to provide a control valve having a plastic housing that is dimensionally comparable and operationally as stable as the equivalent control valve having a metal housing.

Another object of the present invention is to provide a valve structure having a plastic housing that is operationally and dimensionally the equivalent of a similar valve having a metal housing but simplified in construction so that it may be more economically manufactured.

Other and further objects, benefits and advantages of this invention will become apparent from the description thereof contained in the annexed drawings, specifications and claims.

Like characters are used throughout to designate like elements in the illustrative description of our invention.

We have found that a feature of the injection molding of some filled thermoplastic materials is that the exposed surfaces of the parts when removed from the mold contain a thin film or covering of unfilled plastic material. This thin film or covering of unfilled thermoplastic material is approximately two to five ten thousandths of an inch thick and is fused to the underlying core material to form a single integral homogeneous construction. The core material comprises an appropriate filler dispersed in a matrix of thermoplastic material, the thermoplastic material being the same material that forms the thin film or layer of unfilled thermoplastic on the surface of the molded parts.

We have further found that this thin film of unfilled thermoplastic material can be utilized to provide a permanently deformable material that will permit the fluid tight sealing of valve members in plastic valve housings without the excessive deformation that has been present in previous unfilled plastic materials, or the chipping and cracking of the contact area that has been present in previous plastic valve housings utilizing filled plastic materials. We have further found that by molding a filled thermoplastic into a valve housing configuration with a wide angle chamfer or tapered recess mold into the housing adjacent to and in fluid communication with the main housing bore as an integral part of the molding process, a valve member can be pressed into the thin film of unfilled thermoplastic covering the as molded tapered recess such that the thin film will be deformed into fluid tight sealing engagement with the valve member without chipping or cracking the adjacent filled thermoplastic material. Additionally, we have found a preferred formulation of filled thermoplastic comprises nylon, approximately 40% by volume of a glass fiber filler material and approximately 5% by volume of an anti-friction agent, such as molybenum disulphide, mixed with a single co-mingled particulate mixture and injection molded to form the valve housing configuration.

We have further found that the valve geometry, in conjunction with the established parameter of fluid pressure, can be controlled, as described in detail elsewhere herein, such that the thin surface layer of unfilled thermoplastic material will be deformed so as to form a fluid tight sealing engagement with the valve member while the filled thermoplastic core material immediately adjacent the deformed thin layer of unfilled thermoplastic remain substantially undisturbed and structurally sound.

Figure 2:
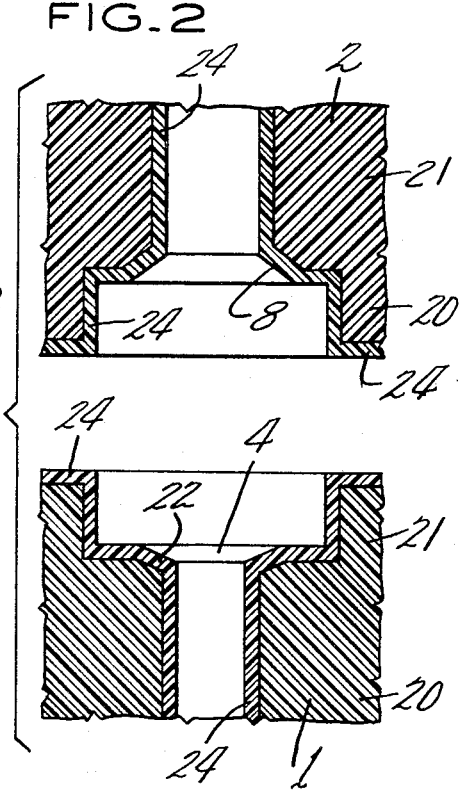
FIGURE 2 is a diagram, much enlarged, illustrating the thin film or layer of unfilled thermoplastic that covers the core material filler dispersed within the thermoplastic matrix that is a result of the molding of filled thermoplastic materials.

We have found, as shown in FIGURE 2, that when a plastic valve housing 1, 2 comprising a thermoplastic material 20 and a filler 21 is molded with a wide angle chamfer as part of the molding process, the frustro-conical section 4 formed by the wide angle chamfer 22 will be covered with a thin layer of relatively unfilled thermoplastic 24.

Figure 4:
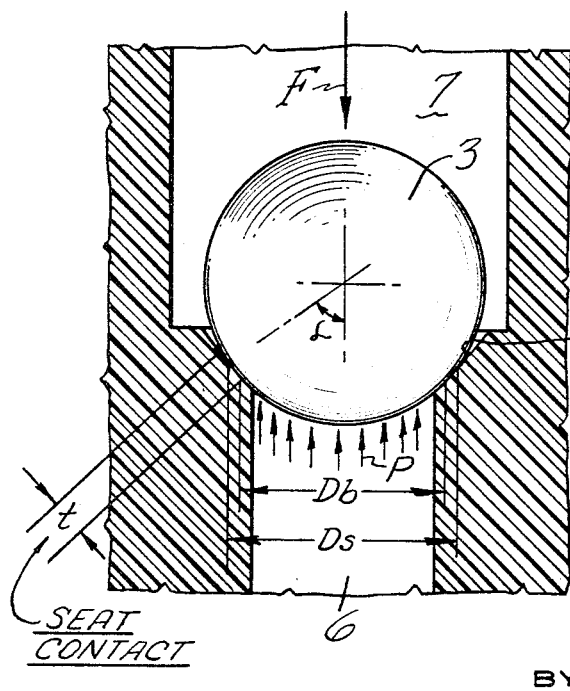
FIGURE 4 illustrates the geometric considerations utilized in establishing the contact stresses that are used to establish the controlled deformation of the thin film of unfilled plastic material.
Figure 3:
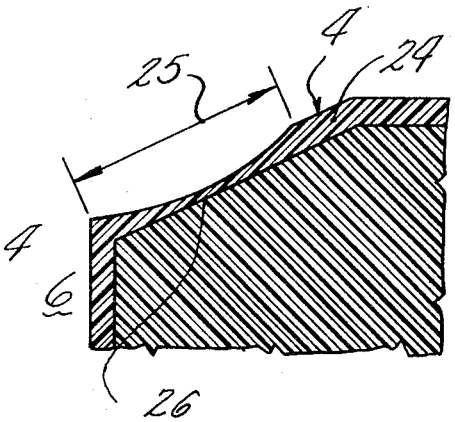
FIGURE 3 illustrates the process of deforming the unfilled thin film of thermoplastic material to form the sealing contact area with the valve member.

If the valve member 3, as shown in FIGURE 4, is pressed into this frustro-conical section 4, the thin layer of unfilled thermoplastic material 24 will be deformed, as shown in FIGURE 3, such that an annular area of contact 25 between the thermoplastic material 24 and the valve member 3 is established. With wide angle chamfer, relatively large contact areas may be formed with small axial deformations. This area of contact 25 provides a fluid tight sealing engagement surface between the valve member 3 and the frustro-conical section 4.

FIGURE 4 illustrates the procedure of applying the force (F) necessary to deform the thin layer of unfilled thermoplastic 24 to produce the annular area of fluid tight engagement 25 between the valve member 3 and the frustro-conical section 4 adjacent the bore 6 without disturbing the core material 26 immediately adjacent the deformed thin film 24 of contact area 25.

The load on the frustro-conical section 4 per unit of circumferential length is established in accordance with the following equation:

$$l = \frac{F}{\pi D_s \cos \alpha} - \frac{P \pi D_b^2}{4 \pi D_s \cos \alpha} \qquad (1)$$

wherein:

$l$ = load per unit of circumferential length—lbs. per inch.
$P$ = applied pressure—lbs. per square inch.
$D_b$ = diameter at first point of contact between valve member and frusto-conical section on the pressure side of the engagement area—inches.
$D_s$ = the mean diameter of the frustro-conical section—inches.
$\alpha$ = the angle established by the intersection of a line representing the axis of the longitudinal bore and a line drawn normal to the fgrustro-conical surface and through the point of intersection of the means diameter and the frustro-conical surface—radians.
$F$ = the applied deforming force—lbs.

Utilizing the load per unit of circumferential length established by Equation 1, the contact stress ($\sigma$) in the unfilled thermoplastic layer 24 produced by forcing the valve member 3 onto this unfilled layer can be established by the following equation:

$$\sigma = \frac{l}{t} \qquad (2)$$

wherein:

$\sigma$ = the contact stress—lbs. per square inch.
$l$ = load per unit of circumferential length per Equation 1—lbs. per inch.
$t$ = width of contact between the frustro-conical section and valve member—inches.

We have found that by constructing a plastic valve housing by molding a filled thermoplastic material to form the valve housing, the exposed surfaces will be covered with a thin layer of unfilled thermoplastic material. We have further found that by molding the plastic valve housing with a chamfer or tapered recess adjacent the passageway or bore, a thin layer of unfilled thermoplastic will cover the surface of this tapered recess or the frustro-conical section. By pressing the valve member at room temperature and without the application of external heat into the unfilled layer of thermoplastic covering the tapered recess in such a manner that the contact stress, in accordance with Equation 2, will be such as to deform said thin layer of thermoplastic, but will not appreciably deform the core material of filled thermoplastic immediately adjacent said unfilled layer, a fluid tight sealing engagement can be established between the valve member and the surface of the tapered recess. This process permits the valve member to establish a fluid tight sealing engagement by deforming the thin layer of unfilled plastic material covering the surface of the tapered recess while the much more structurally rigid filled core material prevents the valve member from becoming deeply imbedded in the plastic material and thus creating excess travel of the valve member with resulting dynamic instability.

Thus, this invention solves the problem of providing a molded plastic valve housing that will provide a fluid tight sealing arrangement for high pressure gaseous fluids while preventing excessive stroke of the valve member due to excessive deformation of the plastic material. This invention further reduces the dynamic instability present in previous plastic valve housing resulting from excessive valve member stroke caused by constantly increasing stroke length resulting from repeated impact deformation of the frustro-conical section of the valve housing due to rapid cycling during operation.

Figure 1:
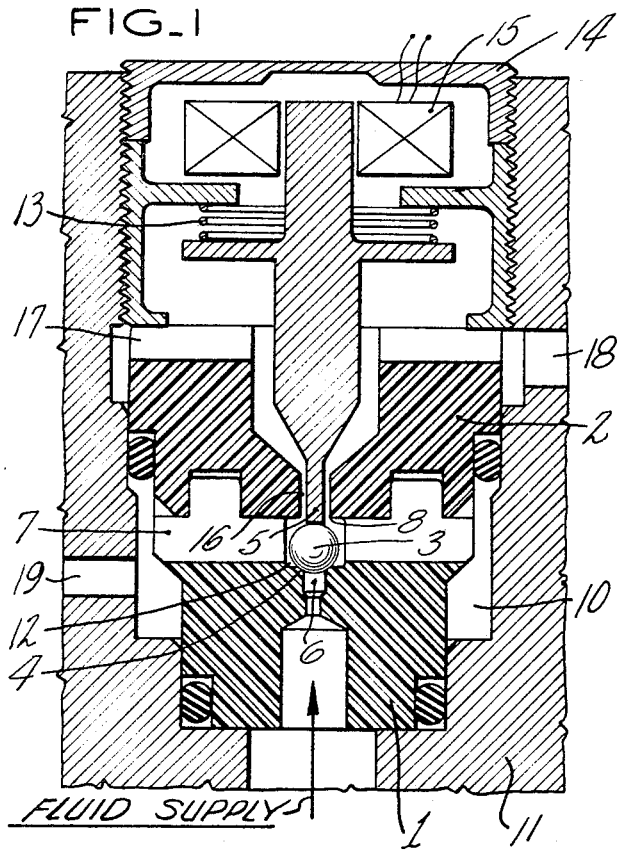
FIGURE 1 shows partially in section and on a large scale a preferred embodiment two-position ball type control valve suitable for manufacture with a molded thermoplastic housing according to this invention.

FIGURE 1 illustrates one form of control valve utilizing the plastic valve housing of this invention. The control valve shown in FIGURE 1 is a two-position valve comprising an upper valve housing 2 and a lower valve housing 1. The upper valve housing 2 and lower valve housing 1 are molded from a filled thermoplastic material. A wide angle chamfer or ball seat 8 is molded into the upper housing, and similarly a wide angle chamfer or ball seat 4 is molded into the lower housing 1. The upper housing 2 and lower housing 1 are installed in cavity 10 of housing 11, as shown in FIGURE 1. Valve member 3 is positioned in cavity 12 intermediate upper valve housing 2 and lower valve housing 1 prior to their installation into cavity 10 of housing 11. Valve member 3 is normally held in engagement with tapered recess 4 by means of plunger 5. Plunger 5 is urged into engagement with valve member 3 by means of spring 13. The force of spring 13 is transmitted through plunger 5 into valve member 3, thus urging valve member 3 into fluid tight engagement with tapered recess 4 such that high pressure fluid in passageway 6 supplied to passageway 6 from a source of pressurized fluid such as a pressurized bottle (not shown) is prevented from escaping into passageway 7. Upper valve housing 2 and lower valve housing 1 are secured in cavity 10 in housing 11 by means of threaded cap 14. The force of spring 13 is removed from plunger 5 by means of the counteracting force generated when solenoid 15 is energized. The gas pressure in passageway 6 reacting on valve member 3 generates a force that will propel valve member 3 into sealing engagement with tapered recess 8 of upper housing 2, thus permitting the flow of fluid from passageway 6 into passageway 7, and thence into connecting passageway 19. The movement of valve member 3 into sealing engagement with tapered recess 8 simultaneously prevents the escape of fluid into vent passage 16. When solenoid 15 is de-energized, the force of spring 13 will urge plunger 5 to return valve member 3 to sealing engagement with tapered recess 4, and thus re-seal valve member 3 on tapered recess 4 and simultaneously permit the escape of fluid from passageway 7 into connecting annulus 16, and thence through interconnecting slot 17 into vent port 18. Thus, it is apparent that valve member 3 moves from sealing engagement with tapered recess 4 to sealing engagement with tapered recess 8, responsive to energization of solenoid 15, thus providing a two-position control valve. The sealing engagement between valve member 3 and tapered recesses 4 and 8 is formed by deforming the thin layer of unfilled thermoplastic material that is present on the surfaces of tapered recesses 4 and 8 when the valve housings are molded from a filled thermoplastic material.

We have also found that the best results can be obtained according to the method of molding plastic valve housings described herein by injection molding valve housings using a nylon thermoplastic that is filled 40% by volume with glass fibers and 5% by volume with molybdenum disulphide. As shown by FIGURE 4 and Equations 1 and 2, no hard and fast rule can be given as to the exact formulation of thermoplastic material and filler material, or the exact force to be applied to the valve member when deforming the thin surface layer of unfilled thermoplastic to establish the optimum area of sealing engagement. However, with a given set of design conditions, a dynamically stable high pressure control valve utilizing a plastic valve housing and having a fluid tight sealing engagement can be manufactured by using Equations 1 and 2 in conjunction with the novel method of molding plastic valve housings described herein.

We have found that on certain valve structures, such as the two-position valve structure shown in FIGURE 1, it is possible to assemble the valve unit with a plastic housing, as shown, and obtain the necessary deformation of the thin surface layer of unfilled thermoplastic by cyclically operating the two-position valve without any deforming or sealing force or pressure being applied to the valve member prior to assembly of the complete valve. Other forms of control valves may require the pre-seating or sealing of the valve member in the frusto-conical section adjacent the bore by applying force to the valve member sufficient to deform the thin surface layer of unfilled thermoplastic prior to assembly of the valve. We have found for best results that when an external sealing force is necessary the force applied to the valve member should be such that the contact stress established by Equation 2 should be in excess of the yield strength of the unfilled thermoplastic material.

The following are examples of suitable compositions of filled thermoplastic materials for the molding of plastic valve housings to be processed in accordance with the present invention:

*Example 1*

Matrix—U.S. Type 6/10 nylon.
Filler—Glass fibers approximately .0003 inch diameter and .30 inch in length.
Lubricant—Molybdenum disulphide.
Fractional volume of filler—40%.
Fractional volume of lubricant—5%.

The above materials furnished as a pre-compounded commercial mixture of the Fiberfil Company of Warsaw, Indiana, and known as Grade G–10/40/ms./5.

*Example 2*

Matrix—U.S. Type 6/10 nylon.
Filler—Glass fibers approximately .0003 inch diameter and .03 inch in length.
Lubricant—Molybdenum disulphide.
Fractional volume of filler—40%.
Fractional volume of lubricant—5%.

The above materials furnished as a pre-compounded commercial mixture of the Liquid Nitrogen Processing Corp. of Malvern, Pennsylvania, and known as Grade RFL 4218F2D.

*Example 3*

Matrix—Polycarbonate.
Filler—Glass fibers approximately .0003 inch diameter and .30 inch in length.
Lubricant—TFE (tetrafluorethylene).
Fractional volume of filler—40%.
Fractional volume of lubricant—12%.

The above materials furnished as a pre-compounded commercial mixture of the Fiberfil Company of Warsaw, Indiana, and known as Grade G–50/40/TF/12.

It will be appreciated that of all the thermoplastic materials at present available, U.S. Type 6/10 nylon is the one best material presently suited for the manufacture of high pressure plastic valve housings in accordance with this invention. We have found that best results have been obtained by using a 40% by volume fiberglass filler in conjunction with the U.S. Type 6/10 nylon. However, the percentage of the filler can be varied from 10% to 45% by volume without detriment to the operating performance of high pressure control valves having plastic valve housings prepared in accordance with this invention.

To illustrate the conditions that may be encountered in a typical high pressure control valve arrangement having a plastic valve housing, as herein contemplated, the fluid pressure in passageway 6 of the valve assembly, shown in FIGURE 1, may be 3,000 p.s.i. with the fluid being gaseous helium, the diameter of passageway 6 may be .035", with the diameter of the ball comprising valve member 3 being .093", and the diameter of the bore that comprises the outer circumference of annulus 16 being .055". The included angle of the tapered recess adjacent bore 6 that forms the frusto-conical section 4 is 138 degrees, and the included angle of the tapered recess adjacent annulus 16 that forms the frusto-conical section 8 that is in engagement with valve element 3 is 110 degrees. The total travel of valve element 3 from engagement with tapered seat 4 to engagement with tapered seat 8 is approximately 0.13".

While we have illustrated and described a preferred embodiment of our invention, it is to be understood that such is merely illustrative and not restrictive, and that variations and modifications may be made therein without departing from the spirit and scope of our invention. We, therefore, do not wish to be limited to the precise

We claim:

1. The method of constructing a fluid tight dynamically stable valve having a plastic housing comprising the sequential steps of molding a filled thermoplastic material to form a valve housing having a frusto-conical cavity covered with a thin layer of unfilled thermoplastic material and at least one passageway in fluid communication with said frusto-conical cavity, pressing a valve member into said frusto-conical cavity with a force sufficient to deform said thin layer of thermoplastic material into an annular area of fluid tight sealing engagement with said valve member and simultaneously controlling the increase of said annular area of sealing engagement during the deformation of said thin layer of unfilled thermoplastic such that the filled thermoplastic material immediately adjacent said deformed thin layer of unfilled thermoplastic remains substantially undeformed.

2. A method of making a high pressure fluid tight valve with a plastic housing comprising the steps of molding a filled thermoplastic preparation to form a valve housing having a wide angle frusto-conical recess covered with a thin layer of comparatively more readily deformable unfilled thermoplastic integral with said filled preparation and at least one passageway in fluid communication with said frusto-conical cavity, pressing a valve member into said frusto-conical cavity with a force sufficient to deform said thin layer of comparatively more readily deformable unfilled plastic into a fluid tight sealing engagement with said valve member, said deformation of said unfilled thin layer simultaneously increasing the contact area of said valve member and said thin layer such that the resulting compressive stress is such that the filled thermoplastic material immediately adjacent said deformed thin layer of unfilled thermoplastic remains substantially undeformed.

3. The method of making a high pressure fluid tight valve having a plastic housing comprising the steps of molding a filled thermoplastic preparation to form a valve housing having a wide angle tapered recess covered with a thin layer of comparatively more readily deformable unfilled thermoplastic material integrally associated with said filled preparation and at least one bore in fluid communication with said tapered recess and the exterior of said housing, pressing a valve member into said tapered recess with a force sufficient to deform said thin layer of said thermoplastic into a fluid tight sealing engagement with said valve member, said deformation of said thin layer of unfilled thermoplastic cooperating with said wide angle tapered recess to simultaneously increase the area of said sealing engagement such that the filled thermoplastic material immediately adjacent said deformed thin layer of unfilled thermoplastic material remains substantially undeformed.

4. A method according to claim 3 wherein the thermoplastic material is nylon, the filler is fiberglass and molybdenum disulphide including the step of mixing said nylon, fiberglass and molybdenum disulphide such that the final mixture is at least 10% by volume fiberglass and 5% by volume molybdenum disulphide.

5. The method of making a fluid tight valve comprising the steps of mixing a particulate thermoplastic, not less than 10% by volume of fiberglass and not less than 1% by volume of molybdenum disulphide to produce a single commingled particulate mixture, molding said single commingled particulate mixture to form a valve housing having a tapered portion covered with a thin layer of unfilled thermoplastic and at least one passageway in fluid communication with said tapered portion and the exterior of said housing, pressing a valve member into said tapered portion with a force sufficient to deform said thin layer of unfilled thermoplastic into a fluid tight sealing engagement with said valve member, said deformation simultaneously increasing the contact area between said valve member and said tapered portion such that the resulting contact stress is such that the filled thermoplastic material immediately adjacent said deformed thin layer of unfilled thermoplastic material remains substantially undeformed.

6. A method according to claim 5 including the step of injection molding said single commingled mixture to form a valve housing having a tapered recess covered with a thin layer of unfilled thermoplastic and at least one passageway in fluid communication with said tapered portion and the exterior of said valve housing.

7. A method according to claim 5 including the step of compression molding of valve housing having a tapered recess covered with a thin layer of unfilled thermoplastic and at least one passageway in fluid communication with said tapered portion and the exterior of said valve housing.

8. A method according to claim 5 including the step of pressing a ball into said tapered portion with sufficient force to deform said thin layer of unfilled thermoplastic into an area of spherical fluid tight engagement with said ball.

9. A valve including an unyielding valve element comprising, a body of reinforced filled plastic having a deformable surface layer of unfilled plastic, a valve seat in said body haing a tapered portion with the permanent indentation of said valve in the unfilled layer only of said tapered portion.

10. A valve including a metal ball valve element comprising, a valve body of reinforced plastic having a deformable surface layer of comparatively more readily deformable unfilled plastic integrally bonded to said reinforced plastic, a valve seat in said body having a tapered portion with the contour of said valve element permanently impressed into said unfilled layer less than the thickness of said layer, resilient means holding said valve in fluid tight sealing relation on said seat, disabling means, said disabling means upon actuation disabling said resilient means to permit said valve element to break fluid tight sealing engagement with said impressed contour.

References Cited

UNITED STATES PATENTS

| | | | |
|---|---|---|---|
| 2,853,976 | 9/1958 | Gerwig et al. | 251—30 X |
| 3,155,014 | 11/1964 | Genz. | |
| 3,176,713 | 5/1965 | McDermott et al. | 251—368 X |
| 3,188,048 | 6/1965 | Sutherland | 251—368 X |
| 3,251,575 | 5/1966 | Campbell et al. | 251—368 X |

FOREIGN PATENTS 842,238   7/1960   Great Britain.

ARNOLD ROSENTHAL, *Primary Examiner.*

UNITED STATES PATENT OFFICE
CERTIFICATE OF CORRECTION

Patent No. 3,395,890                                            August 6, 1968

Arthur F. J. Eckert et al.

It is certified that error appears in the above identified patent and that said Letters Patent are hereby corrected as shown below:

Column 6, line 69, "0.13" should read -- .013 --.

Signed and sealed this 16th day of December 1969.

(SEAL)
Attest:

Edward M. Fletcher, Jr.                          WILLIAM E. SCHUYLER, JR.
Attesting Officer                                      Commissioner of Patents